United States Patent
Pang

(10) Patent No.: US 8,896,659 B2
(45) Date of Patent: Nov. 25, 2014

(54) INTEGRATING PRESET CALLBACK INTO CONFERENCE CALLS

(75) Inventor: Tak Ming Francis Pang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 13/464,576

(22) Filed: May 4, 2012

(65) Prior Publication Data
US 2013/0293665 A1  Nov. 7, 2013

(51) Int. Cl.
*H04N 7/15* (2006.01)

(52) U.S. Cl.
USPC .................................. 348/14.08; 379/202.01

(58) Field of Classification Search
USPC ............ 348/14.08, 14.09; 379/202.01, 203.01
See application file for complete search history.

(56) References Cited

U.S. PATENT DOCUMENTS

| | | | |
|---|---|---|---|
| 7,912,193 B2 | 3/2011 | Chingon et al. | |
| 2007/0037561 A1* | 2/2007 | Bowen et al. | 455/418 |
| 2007/0285502 A1* | 12/2007 | Yee | 348/14.08 |
| 2008/0159511 A1* | 7/2008 | Keohane et al. | 379/202.01 |
| 2008/0250393 A1 | 10/2008 | Bolene et al. | |
| 2011/0007887 A1* | 1/2011 | Green et al. | 379/203.01 |

OTHER PUBLICATIONS

Cisco Quick Start Guide "Attending and Scheduling a Cisco WebEx Meeting with Cisco Unified MeetingPlace Release 7.0" Sep. 19, 2008.

* cited by examiner

*Primary Examiner* — Stella Woo
(74) *Attorney, Agent, or Firm* — Tucker Ellis LLP

(57) ABSTRACT

In an example embodiment, there is disclosed an apparatus comprising an interface and conferencing logic coupled with the interface. The conferencing logic is operable to receive via the interface data representative of a conference call for a meeting, the data representative of the meeting comprises data representative of a meeting time and data representative of a meeting participant. The conferencing logic is operable to receive via the interface data representative of a callback number and data representative of a callback time from the meeting participant. The conferencing logic is operable to initiate communications with the meeting participant at the callback time at the callback number. The conferencing logic is operable to couple the meeting participant with the conference call upon establishing communications.

17 Claims, 5 Drawing Sheets

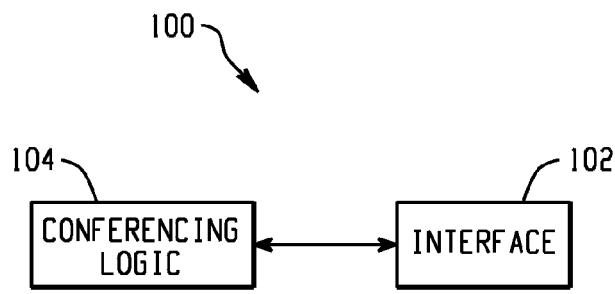
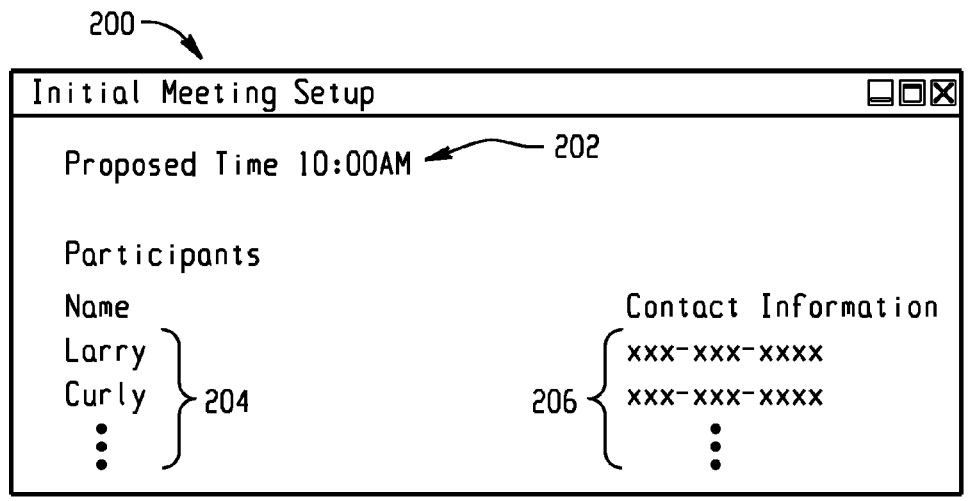
Fig. 2
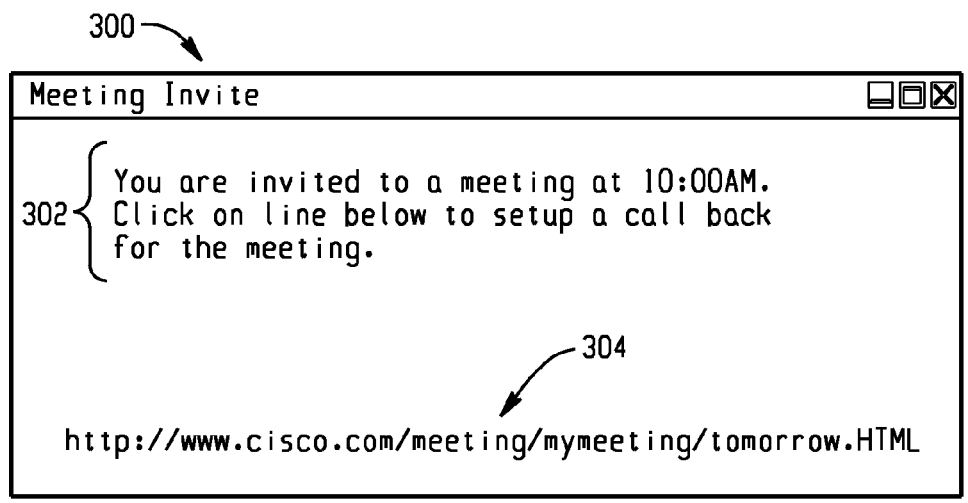
Fig. 3

INTEGRATING PRESET CALLBACK INTO CONFERENCE CALLS

TECHNICAL FIELD

The present disclosure relates generally to conferencing.

BACKGROUND

Teleconferencing and web-conferencing, which may employ video, audio, and/or data are gaining in popularity. However, many meeting participants miss meetings for various reasons. For example, a participant may be distracted or mistaken about the meeting start time. A participant may also miss a meeting because they forgot to bring their laptop or other computing device with the meeting information, forgot the dial in number and/or forgot the meeting number or passcode. These problems can occur when a participant is away from their computer or does not pay attention to a meeting reminder.

BRIEF DESCRIPTION OF THE DRAWINGS

The accompanying drawings incorporated herein and forming a part of the specification illustrate the example embodiments.

FIG. 1 is a block diagram of an apparatus for integrating preset callback into a conference call.

FIG. 2 illustrates an example screen display for setting up a meeting integrating preset callback.

FIG. 3 illustrates an example of a meeting invitation for a meeting integrating preset callback.

OVERVIEW OF EXAMPLE EMBODIMENTS

Figure 4:
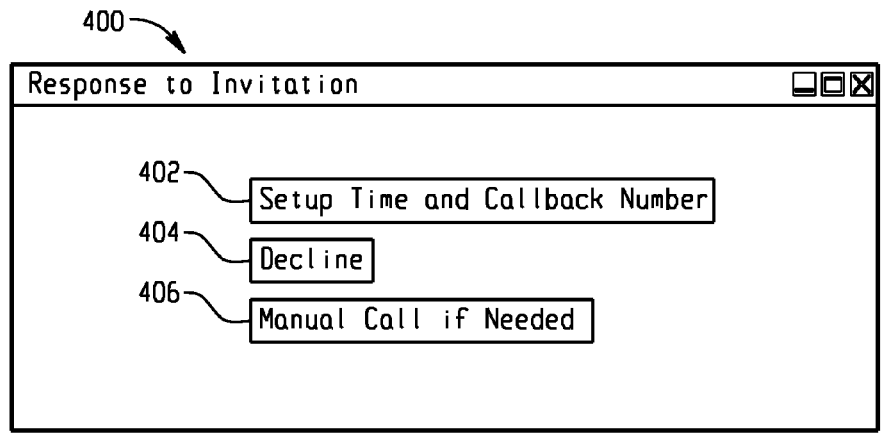
FIG. 4 illustrates an example response to an invitation for a meeting integrating preset callback.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an interface and conferencing logic coupled with the interface. The conferencing logic is operable to receive via the interface data representative of a conference call for a meeting, the data representative of the meeting comprises data representative of a meeting time and data representative of a meeting participant. The conferencing logic is operable to receive via the interface data representative of a callback number and data representative of a callback time from the meeting participant. The conferencing logic is operable to initiate communications with the meeting participant at the callback time at the callback number. The conferencing logic is operable to couple the meeting participant with the conference call upon establishing communications.

In accordance with an example embodiment, there is disclosed herein logic encoded in a non-transitory tangible computer readable medium for execution by a processor, and when executed operable to receive data representative of a conference call for a meeting, the data representative of the meeting comprises data representative of a meeting time and data representative of a meeting participant. The logic is further operable to receive data representative of a callback number and data representative of a callback time from the meeting participant. The logic is operable to initiate communications with the meeting participant at the callback time at the callback number, and couple the meeting participant with the conference call.

In accordance with an example embodiment, there is disclosed herein a method comprising receiving data representative of a conference call for a meeting, the data representative of the meeting comprises data representative of a meeting time and data representative of a meeting participant. Data representative of a callback number and data representative of a callback time is received from the meeting participant. A conference server initiates communications with the meeting participant at the callback time, at the callback number and couples the meeting participant with the conference call.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is disclosed herein a technique where a meeting participant can provide contact information enabling a device hosting the meeting to contact the user at a predetermined time to join a meeting. In an example embodiment, a universal resource link (URL) is included in a meeting invitation sent to a participant to allow the participant to communicate with the conferencing server. This allows a participant to accept the invitation. In addition, the conferencing server provides options through Web pages that allow the participant to preset a callback time and a phone number. By default, the callback time is set to the start of the meeting. The server also allows a participant to provide additional alternate phone numbers.

At the appropriate time, the server will call the main number for the participant first, and then the alternate numbers until a response is received from the participant. For example, waiting for the participant to press 1 (or any other preset number) to join the meeting after picking up the call.

In an example embodiment, when the meeting is setup, the participant's usual (default) phone numbers are automatically imported from the user's profile. The participant, when accepting the meeting invitation will have the option to change phone numbers and/or re-arrange the order of phone numbers on the list.

In an example embodiment, the participant may set a time that is any time before the meeting finishes. In particular embodiments, if the meeting participant sets a call back that is after the start of the meeting, a notification may be sent to the host. This can allow the host to decide whether to re-schedule the meeting.

In an example embodiment, if the start time of the meeting is changed, the participant will automatically be notified of the change. The callback time will automatically be set to the new start time of the meeting. However, the participant may employ the link to change the callback time.

In an example embodiment, a participant has the option to set a new callback time and/or number. For example, the conferencing server may employ an interactive voice response (IVR) system that can provide the meeting participant with prompts for setting the new call time and/or number. This feature can be useful if the participant is really in the middle of something and would like to join the meeting some time later that is more convenient.

In an example embodiment, the conferencing server can provide meeting participants and/or the meeting host a participant list with an icon representing the current status. This can help the host and other participant to understand the intent of a participant, e.g., whether the participant is joining the meeting and/or when the participant will be joining the meeting. This can relieve the host from trying to contact the person through email, a phone call, or IM.

In an example embodiment, if a participant's preset time is after the meeting's start time, the conferencing server can display a scheduled time the missing participant intends to join the meeting. This can allow a host to conduct the meeting around without the missing meeting participant. For example, a meeting participant may be late because the meeting participant is still attending a previous meeting.

In an example embodiment, the preset callback number can be set to be a manual call by the host rather than automatic call from the system. For example, a meeting participant can make the request that the host should call if the meeting runs into issue that requires the meeting participant's presence. For example, the meeting participant could attend another meeting during the time of the meeting, but the meeting participant can convey to the host that the meeting participant is available on an as needed basis.

FIG. 1 is a block diagram of an apparatus 100 for integrating preset callback into a conference call. The apparatus 100 comprises an interface 102 and conferencing logic 104 coupled with the interface 102. The interface 102 may be suitable for wired and/or wireless communications. The conferencing logic 104 is operable to send and receive data via the interface 102. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the conferencing logic 104 is operable to receive via the interface 102 data representative of a conference call for a meeting, the data representative of the meeting comprises data representative of a meeting time, and in particular embodiments a date, and data representative of a meeting participant. The conferencing logic 104 is operable to receive via the interface data representative of a callback number, or any suitable identifier, such as an Internet Protocol (IP) address and port, for establishing communications and data representative of a callback time, which may also include a date, from the meeting participant. The conferencing logic 104 is operable to initiate communications with the meeting participant at the callback time at the callback number and to couple the meeting participant with the conference call after establishing communications.

In an example embodiment, the conferencing logic 104 is further operable to wait for data representative of a response from the meeting participant before coupling the meeting participant with the conference call. For example, the conferencing logic 104 may employ IVR to allow a user to select from a plurality of options such as join the meeting, join the meeting at a later time and/or at a different callback number, do not join the meeting, and do not join the meeting but inform other meeting participants that the meeting participant is available if needed.

In an example embodiment, the conferencing logic 104 receives a response from the meeting participant indicating the meeting participant will join the meeting at a later time (e.g., a new callback time) and/or callback number. The conferencing logic 104 is responsive to the data representative of a new callback time to initiate communications with the meeting participant at the new callback time and/or callback number. In particular embodiments, the conferencing logic 104 provides data representative of the new callback time to other meeting participants.

In an example embodiment, the conferencing logic 104 is operable to receive data representative of a new meeting time via the interface 102. The conferencing logic 104 is operable to send a notification to the meeting participant with data representative of the new meeting time. In particular embodiments, the conferencing logic 104 automatically changes the callback time to the new meeting time. In an example embodiment, the notification further comprises a link, such as an URL, enabling the meeting participant to change the callback time.

In an example embodiment, the meeting participant provides a plurality of callback numbers. The conferencing logic 104 selectively attempts to initiate communications with the meeting participant via the plurality of callback numbers. For example, the conferencing logic 104 may attempt to connect with a first callback number of the plurality of callback numbers, and if unsuccessful, attempt to connect with the next number in the plurality of callback, and continue until a connection is established or none of the plurality of numbers remain. If no connection was established, the conferencing logic 104 may again loop through the plurality of numbers until a connection is established. In particular embodiments, the conferencing logic 104 may wait a predefined amount of time before making additional loops through the plurality of callback numbers.

In an example embodiment, the data representative of a callback number includes data indicating whether the device associated with the callback number is capable of performing one of a group consisting of audio, data, and audio and data communications. For example, if the meeting participant has a smartphone with video capabilities, the conferencing server 104 may provide audio and video data to the smartphone.

In an example embodiment, the conferencing logic 104 provides status information to other meeting participants regarding the meeting participant. For example, while calling the meeting participant, the conferencing logic may provide data indicating that the meeting participant is being called and the status of the call, such as off hook, ringing, busy, waiting for response, etc. In the case where the meeting participant is joining the meeting later, the conferencing logic 104 may provide a data indicating what time the meeting participant is joining and/or data indicating how long until the meeting participant will join the meeting. The conferencing logic 104 may provide data indicating if the meeting participant has canceled or has indicated that the meeting participant will not be joining the meeting but is available if needed. The status data may be limited to the meeting host or to a select group of participants.

FIG. 2 illustrates an example screen display 200 for setting up a meeting integrating preset callback. The display would allow a person setting up the meeting to specify a meeting time 202, which may also include a date, specify meeting participants 204, and provide contact information 206 for the meeting participants. In an example embodiment, the contact information 206 is used to communicate with meeting participants 204 to notify them of the meeting and to allow the participants to preset a callback for the meeting.

FIG. 3 illustrates an example of a meeting invitation 300 sent to a meeting participant for a meeting integrating preset callback. The meeting invitation 300 comprises meeting data 302 and provides a link, such as a URL, 304 that allows the meeting participant to preset a callback for the meeting.

FIG. 4 illustrates an example response 400 to an invitation for a meeting integrating preset callback. For example, the response 400 may be initiated by clicking on the link 304 provided in the meeting invitation 300 (FIG. 3). In the illustrated example, the response 400 allows the meeting participant to setup a time and callback number for the meeting, "setup time and callback number" 402, cancel or decline the invitation "decline" 404, or to specify the meeting participant will not be attending but is available if needed "Manual Call if Needed" 406.

Figure 5:
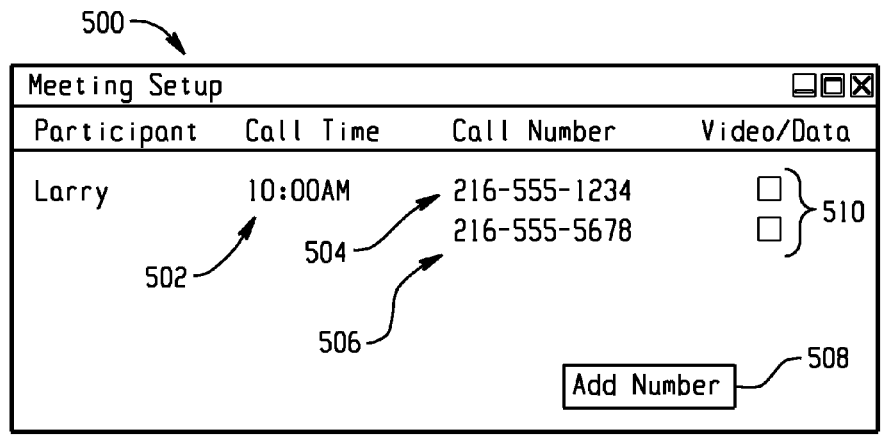
FIG. 5 illustrates an example user interface for setting up a preset callback.

FIG. 5 illustrates an example user interface 500 for setting up a preset callback. The user interface 500 may be reached in response to selecting "setup time and callback number" 402 in the response 400 illustrated in FIG. 4. User interface 500 has an input for a callback time 502, and in particular embodiments a date, and a callback number 504. In particular embodiments, the meeting participant may be able to specify an additional callback number 506. Additional callback numbers may be entered by selecting the Add Number button 508. Optionally, the user interface 500 may provide a field for specifying whether the device associated with the callback number is capable of receiving video and/or data.

Figure 6:
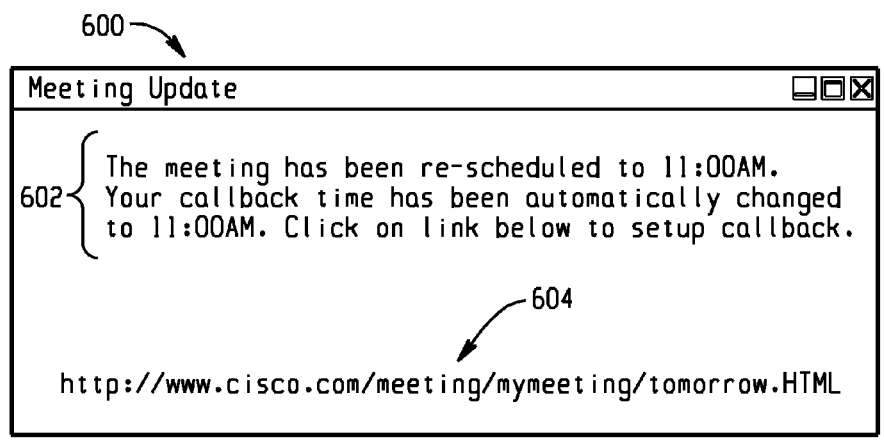
FIG. 6 illustrates an example of a message sent in response to a meeting integrating a preset callback being rescheduled.

FIG. 6 illustrates an example of a message 600 sent in response to a meeting integrating a preset callback being rescheduled. The message 600 comprises data 602 indicating when the meeting has been rescheduled and a link, such as an URL 604, that allows the meeting participant to update their callback time. In an example embodiment, by default a previously entered callback time is changed to the new meeting time; however, the meeting participant can update the callback time via link 604.

Figure 7:
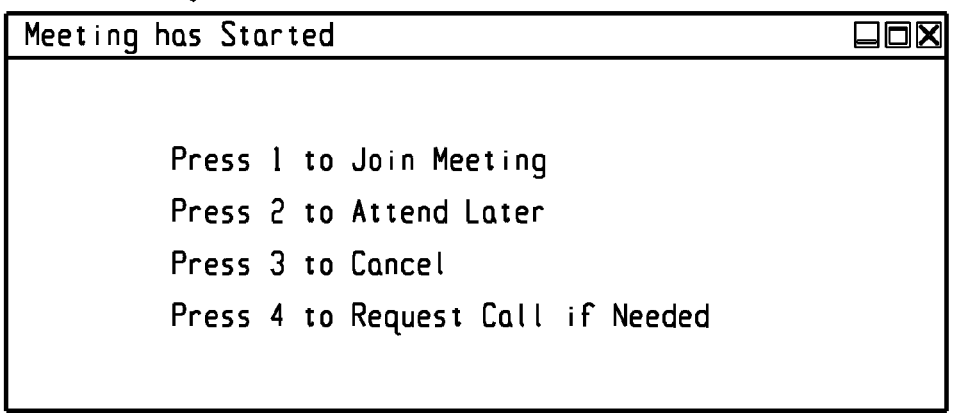
FIG. 7 illustrates an example of a prompt received when a meeting integrating a preset callback has started.

FIG. 7 illustrates an example of a prompt 700 received when a meeting integrating a preset callback has started. Although FIG. 7 illustrates a visual example that may be provided to a computing device, those skilled in the art should readily appreciate the prompts provided in FIG. 7 may also be provided via an audio signal. In the illustrated example, the meeting participant may press one to be coupled with the meeting, two to attend later (an additional prompt similar to FIG. 5 could be provided), three to cancel attending the meeting, or four to indicate user does not wish to attend the meeting but can be reached.

Figure 8:
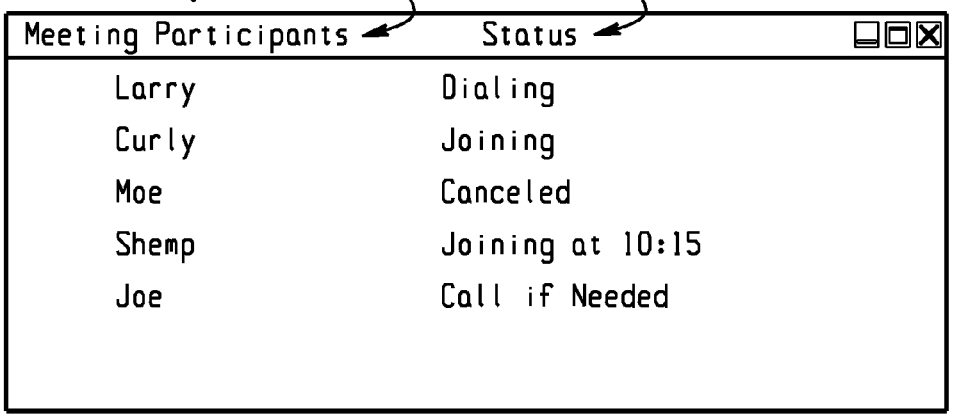
FIG. 8 illustrates an example display illustrating the status of meeting participants.

FIG. 8 illustrates an example display 800 illustrating the status of meeting participants. Column 802 provides a name for the meeting participants (may be an individual name or a group name such as a conference room) and column 804 provides status data. For example, for user Larry, the system is currently dialing a number for Larry. For user Curly, the status indicates that Curly is joining the meeting. The status of Moe indicates that Moe has declined or canceled the meeting. The status for Shemp indicates that Shemp will be joining the meeting at 10:15 (alternatively a countdown timer may be employed, e.g., a timer indicating that Shemp will be joining the meeting in 15:00 minutes). The status for Joe indicates that Joe will not be joining the meeting but to call if needed (in particular embodiments the status data may also include a callback number for Joe).

Figure 9:
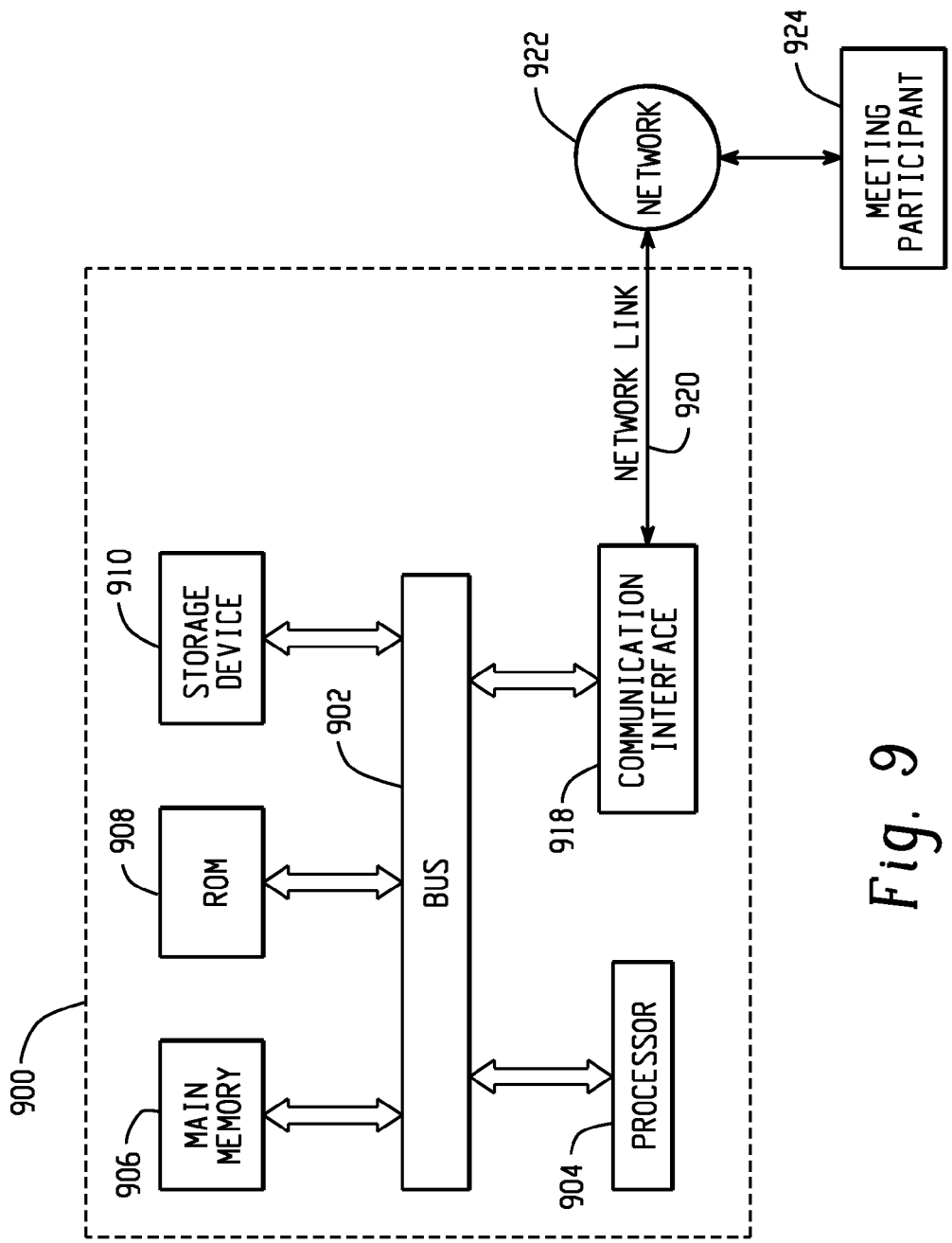
FIG. 9 is an example of a computer system upon which an example embodiment may be implemented.

FIG. 9 is an example of a computer system 900 upon which an example embodiment may be implemented. Computer system 900 may be employed to implement the functionality of conferencing logic 104 (FIG. 1).

Computer system 900 includes a bus 902 or other communication mechanism for communicating information and a processor 904 coupled with bus 902 for processing information. Computer system 900 also includes a main memory 906, such as random access memory (RAM) or other dynamic storage device coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, optical disk, and/or flash storage, is provided and coupled to bus 902 for storing information and instructions.

An aspect of the example embodiment is related to the use of computer system 900 for integrating a preset callback with conference call. According to an example embodiment, integrating a preset callback with a conference call is provided by computer system 900 in response to processor 904 executing one or more sequences of one or more instructions contained in main memory 906. Such instructions may be read into main memory 906 from another computer-readable medium, such as storage device 910. Execution of the sequence of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 904 for execution. Such a medium may take many forms, including but not limited to non-volatile media, and volatile media. Non-volatile media include, for example, optical or magnetic disks, such as storage device 910. Volatile media include dynamic memory such as main memory 906. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 900 also includes a communication interface 918 coupled to bus 902. Communication interface 918 provides a two-way data communication coupling computer system 900 to a network link 920 that is connected to a network 922. For example, communication interface 918 may be a local area network (LAN) card to provide a data communication connection to a compatible LAN. As another example, communication interface 918 may be an integrated services digital network (ISDN) card or a modem to provide a data communication connection to a corresponding type of telephone line. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through network 922 to a meeting participant 924.

Figure 10:
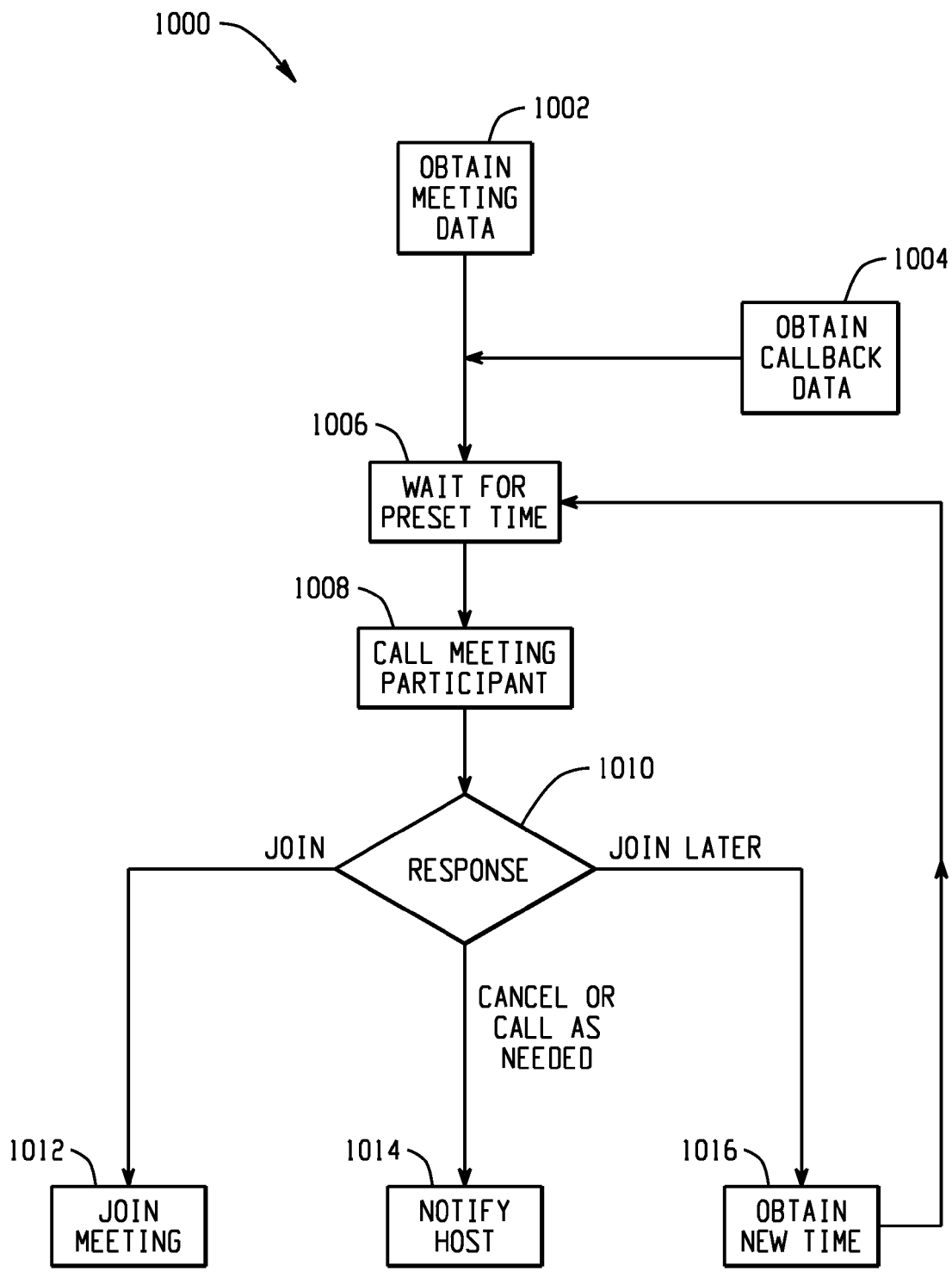
FIG. 10 is a block diagram illustrating a methodology for integrating a preset callback into a conference call.

In view of the foregoing structural and functional features described above, a methodology 1000 in accordance with an example embodiment will be better appreciated with reference to FIG. 10. While, for purposes of simplicity of explanation, the methodology 1000 of FIG. 10 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology 1000 in accordance with an aspect of an example embodiment. The methodology 1000 described herein is suitably adapted to be implemented in hardware, software, or a combination thereof. For example, methodology 1000 may be implemented by conferencing logic 104 (FIG. 1) and/or processor 904 (FIG. 9).

At 1002, meeting data is obtained for a conference call. The meeting data may suitably comprise a time (including date) for the meeting and include a list of participants and contact information, such as email addresses, for the meeting participants. A server associated with the conference call may send an email invitation to meeting participants. The invitations may include a link or instructions for presetting a callback number for the meeting.

At 1004, callback data is obtained. The callback data may suitably comprise a preset callback number and a preset callback time. In particular embodiments, the callback data may include a plurality of callback numbers.

At 1006, the methodology 1000 waits for the preset time. The preset time is the time specified in the callback data obtained at 1004.

At 1008, the meeting participant is called at the preset time. The meeting participant is called at the preset callback number. If, however, the meeting participant specified a plurality of numbers, the plurality of numbers are tried sequentially or in an order specified by the meeting participant. If no response is received, another callback may be attempted, optionally, after waiting a predefined time period.

At 1010, a response is received from the meeting participant. For example, IVR may be employed for obtaining a response.

If, at 1010, the meeting participant selected to join the meeting (JOIN), the participant is coupled with the conference call as indicated at 1012. Optionally, a notification may be provided to other meeting participants indicating the meeting participant has joined.

If, at 1010, the meeting participant indicated that the participant would not be attending the meeting, e.g., either indicating the meeting participant is available if needed or canceling (CANCEL OR CALL AS NEEDED), the host of the meeting is notified as indicated at 1014. In particular embodiments, other meeting participants may also be notified.

If, at 1010, the meeting participant indicated that the meeting participant would join later (JOIN LATER), at 1016 a new callback time is obtained. A new time, which may also include a date, may be entered by the user, or alternatively, the user may be able to select an option, such as callback in 30 minutes. Optionally, or alternatively, a new callback number may also be obtained. After receiving the new callback time and/or callback number, methodology 1000 returns to 1006 to wait for the new callback time.

Although, the example embodiments described herein discuss a preset time, those skilled in the art should readily appreciate that the preset time may also include a date component. Moreover, the examples described herein illustrate examples where the callback number is a phone number; however, those skilled in the art should readily appreciate that the callback number may be any suitable type of number for establishing communications, such as an Internet Protocol (IP) address and port number of a computing device; therefore, a callback number as described herein should not be construed as limited to a telephone number.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   an interface;
   conferencing logic coupled with the interface;
   wherein the conferencing logic is operable to receive via the interface data representative of a conference call for a meeting, the data representative of the conference call for the meeting comprising data representative of a meeting time and data representative of an associated meeting invitee;
   wherein the conferencing logic is operable to receive via the interface data representative of a callback number and data representative of a callback time from the associated meeting invitee;
   wherein the conferencing logic is operable to initiate communications with the associated meeting invitee at the callback time at the callback number;
   wherein the conferencing logic is operable to selectively couple the associated meeting invitee with the conference call after establishing the communications;
   wherein the conferencing logic is further operable to wait for data representative of a response from the associated meeting invitee before selectively coupling the associated meeting invitee with the conference call;
   wherein the conferencing logic is responsive to the data representative of the response from the associated meeting invitee indicating a new callback time to initiate communications with the associated meeting invitee at the new callback time; and wherein the conferencing logic provides data representative of the new callback time of the associated meeting invitee to associated conference call participants coupled with the conference call.

2. The apparatus set forth in claim 1, wherein:
the conferencing logic is operable to receive data representative of a new meeting time via the interface; and
the conferencing logic is operable to send a notification to the associated meeting invitee with data representative of the new meeting time.

3. The apparatus set forth in claim 2, wherein the conferencing logic is further operable to change the callback time to the new meeting time.

4. The apparatus set forth in claim 2, wherein the notification further comprises a link enabling the associated meeting invitee to change the callback time.

5. The apparatus set forth in claim 1, wherein:
the data representative of a callback number comprises a plurality of callback numbers;
the conferencing logic selectively attempts to initiate communications with the associated meeting invitee via the plurality of callback numbers.

6. The apparatus set forth in claim 5, wherein the conferencing logic waits a predefined amount of time before attempting to initiate communications with the associated meeting invitee via the plurality of callback numbers in response to being unable to establish communications with the associated meeting invitee via the plurality of callback numbers.

7. The apparatus set forth in claim 1, wherein the data representative of a callback number includes data indicating whether the callback number is capable of performing one of a group consisting of audio, data, and audio and data communications.

8. The apparatus set forth in claim 7, wherein the conferencing logic is operable to send video data to the associated meeting invitee after coupling the associated meeting invitee with the conference call responsive to the data representative of a callback number indicating that the callback number is capable of performing video communications.

9. The apparatus set forth in claim 1, wherein the conferencing logic is operable to provide data representative of a countdown time remaining until the new call back time of the associated meeting invitee to the associated conference call meeting participants coupled with the conference call.

10. Logic encoded in a non-transitory tangible computer readable medium for execution by a processor, and when executed operable to:
receive data representative of a conference call for a meeting, the data representative of the conference call for the meeting comprising data representative of a meeting time and data representative of an associated meeting invitee;
receive data representative of a callback number and data representative of a callback time from the associated meeting invitee;
initiate communications with the associated meeting invitee at the callback time at the callback number;
selectively couple the associated meeting invitee with the conference call;
wait for data representative of a response from the associated meeting invitee before selectively coupling the associated meeting invitee with the conference call;
initiate communications with the associated meeting invitee at the new callback time responsive to the data representative of a response from the associated meeting invitee indicating a new callback time; and
provide data representative of the new callback time of the associated meeting invitee to associated conference call meeting participants coupled with the conference call.

11. The logic of claim 10, wherein:
the data representative of a response comprises a new callback number; and
the logic is further operable to initiate communications with the new callback number.

12. The logic of claim 11, further operable to change the callback time to the new meeting time.

13. The logic of claim 10, further operable to receive data representative of a new meeting time via the interface; and
send a notification to the associated conference call meeting participants with data representative of the new meeting time.

14. The logic of claim 10, wherein the data representative of a callback number further comprises data representative of whether the callback number has video data capabilities; and
the logic is further operable to send video data to the associated meeting invitee after coupling the associated meeting invitee with the conference call responsive to the data representative of a callback number indicating that the callback number is capable of performing video communications.

15. The logic of claim 10 when executed being further operable to provide data representative of a countdown time remaining until the new call back time of the associated meeting invitee to the associated conference call meeting participants coupled with the conference call.

16. A method, comprising:
receiving data representative of a conference call for a meeting, the data representative of the conference call for the meeting comprising data representative of a meeting time and data representative of an associated meeting invitee;
receiving data representative of a callback number and data representative of a callback time from the associated meeting invitee;
initiating, by a conference server, communications with the associated meeting invitee at the callback time at the callback number;
selectively coupling, by the conference server, the associated meeting invitee with the conference call:
waiting for data representative of a response from the associated meeting invitee before selectively coupling the associated meeting invitee with the conference call;
initiating communications with the associated meeting invitee at the new callback time responsive to the data representative of a response from the associated meeting invitee indicating a new callback time; and
providing data representative of the new callback time of the associated meeting invitee to associated conference call meeting participants coupled with the conference call.

17. The method according to claim 16, further comprising:
providing data representative of a countdown time remaining until the new call back time of the associated meeting invitee to the associated conference call meeting participants coupled with the conference call.

* * * * *